No. 715,020. Patented Dec. 2, 1902.
A. CHANAL.
MOWING MACHINE CUTTER.
(Application filed Mar. 22, 1902.)
(No Model.)

Witnesses:

A. Chanal Inventor,

By Marion & Marion
Attorneys

UNITED STATES PATENT OFFICE.

ANDRÉ CHANAL, OF DUCK LAKE, CANADA.

MOWING-MACHINE CUTTER.

SPECIFICATION forming part of Letters Patent No. 715,020, dated December 2, 1902.

Application filed March 22, 1902. Serial No. 99,502. (No model.)

*To all whom it may concern:*

Be it known that I, ANDRÉ CHANAL, a subject of the King of Great Britain, residing at Duck Lake, county of Saskatchewan, North-West Territories, Canada, have invented certain new and useful Improvements in Mowing-Machine Cutters; and I do hereby declare that the following is a full, clear, and exact description of the invention, such as will enable others skilled in the art to which it appertains to make and use the same.

My invention relates to improvements in reciprocating knives of mowing-machines, and has for its object to improve the cutting qualities of these knives by preventing the reciprocating portions from becoming loose and by holding them in constant contact with the stationary portions, whereby the two sets of blades will perform their cutting function more perfectly. In machines of the ordinary pattern it is a common defect of these knives that they are not so held in contact with the stationary blades, but have a considerable vertical play by reason of the defective formation of the lugs which press downwardly on the reciprocating knives, and, furthermore, even when the lugs are at first perfectly formed they soon wear loose by the constant friction of the reciprocating knives thereon, so that they rattle up and down in the frame. When this takes place, the edges of the blades no longer act as scissors to cut the grass, but rather tear it through the openings or slots in the stationary blades, and it thus happens that not only is the grass very imperfectly mowed, but large quantities of roots will be torn up along with the mown grass and contaminate the hay. By the present improvement these defects are removed by the insertion of an adjustable piece, whereby when the upper surface of the holding-down lug becomes worn to any extent it may be lowered to an extent corresponding with the amount of wear, and this adjustment may be made either in new machines where no such adjustable piece was present or with machines in which the adjustable piece has already been inserted to take up the wear, in which case the piece will be moved into proper position to take up the newly-acquired wear.

My improvement is illustrated in the accompanying drawings, in which—

Figure 1:
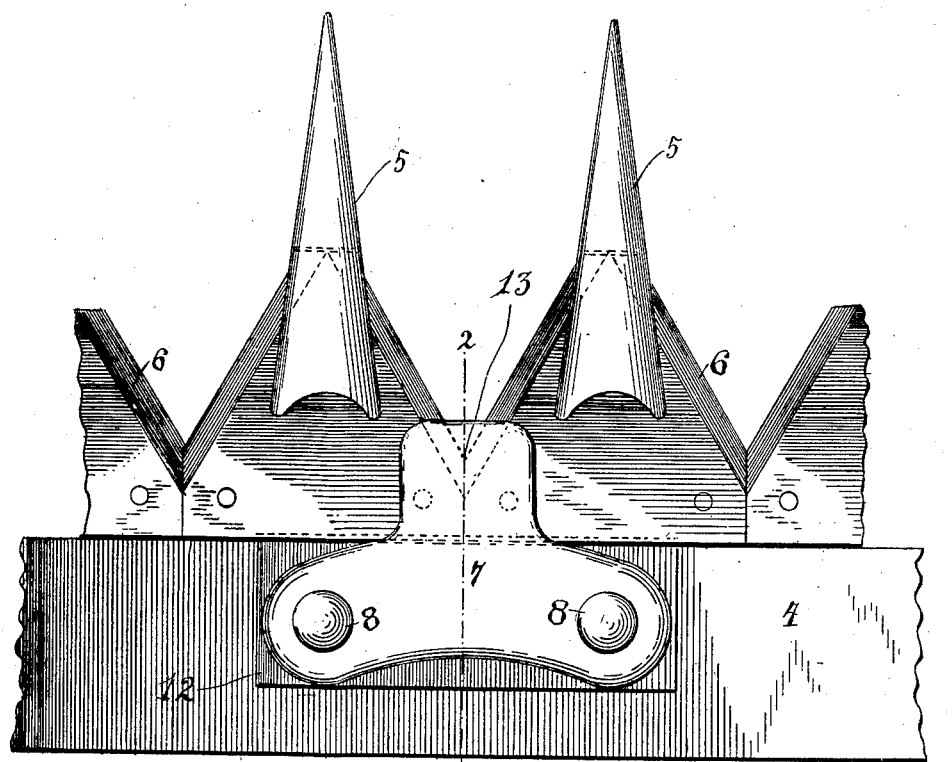
Figure 3:
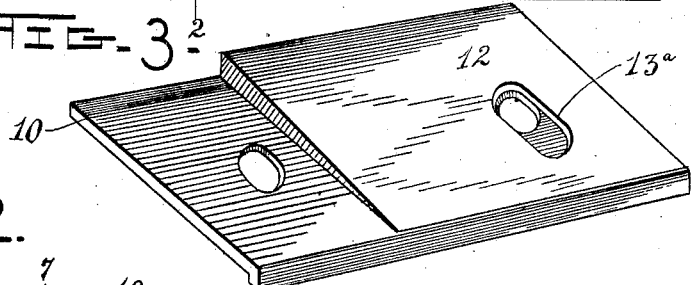
Figure 2:
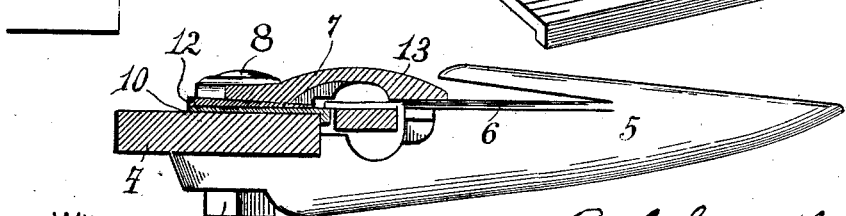

Figure 1 is a plan view of a portion of a mowing-machine cutter, showing the stationary and reciprocating blades and the holding-down lug, together with the adjustable piece, embodying my present improvement. Fig. 2 is a vertical cross-section of the same on the line 2 2 of Fig. 1. Fig. 3 is a detail perspective view of a bearing-plate for the holding-down lug with an adjustable wear-plate embodying my improvement on top thereof, the latter being shown partially broken away.

The same numerals of reference denote like parts in each of the several figures of the drawings.

4 is the cutter-bar, which carries the stationary blades 5, and 6 represents the series of reciprocating cutting-blades, which operate to cut the grass in connection with the blades 5, as will be understood by those familiar with this class of machinery. At intervals on the upper side of the cutter-bar 4 is bolted the holding-down lug 7 by means of the bolts 8, having nuts 9 on the lower ends thereof. The cutter-bar 4 is generally formed of wood, and to avoid crushing the latter by the pressure of the bolts 8 a bearing-plate 10 is ordinarily inserted beneath the lug 7; but this bearing-plate forms no part of my invention and may be omitted or inserted, according as is found desirable. Now in the ordinary machinery the adjustment of the lug 7 is such as to leave an empty space between its outer end and the upper surface of the blade 6, so that the latter is free to move up and down, and thereby is not held in proper contact with the stationary blade 5, immediately under it. This difficulty is avoided by the insertion of the wedge 12, which by turning up the rear side of the lug causes the front extremity 13 to be pressed downwardly to an amount depending upon the position and thickness of the wedge 12. The wedge 12 has slots 13$^a$ formed therein, so that upon any fresh wear the forward extremity 13 of the lug 7 may be again adjusted by simply sliding the wedge 12 backwardly upon the plate 10, whereby to lower said extremity 13. It will be understood that after the wedge 13 has been slid backwardly to its farthest extent, if further adjustment be desired, a new wedge having a greater angle may be introduced in place of the old one; but ordinarily this will not be required.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. In a mowing-machine, the combination of a cutting-blade, a holding-down lug, and a wedge beneath the holding-down lug whereby to adjust the lug into contact with the blade.

2. In a mowing-machine, a cutter-bar, a set of cutting-blades secured thereto, a reciprocating cutter-blade operating therein, a lug on the upper surface of the cutter-bar for holding the reciprocating blades in contact with the stationary blades, and a wedge inserted between the lug and the cutter-bar for adjusting the lug in proper relative position.

3. In a mowing-machine, a cutter-bar supporting two sets of coacting knives, a lug on the upper side of the upper set for holding the knives in contact with one another, a bearing-plate beneath the lug, and an adjustable wedge between the bearing-plate and the lug.

4. In a mowing-machine, a cutter-bar, two sets of knives carried thereby, a lug for holding the knives in contact with each other, bolts passing through apertures in the lug for securing the same to the cutter-bar, and an adjustable wedge having slots therein through which the bolts pass for adjusting the outer end of the lug in proper relative position to said blades.

In witness whereof I have hereunto set my hand in the presence of two witnesses.

ANDRÉ CHANAL.

Witnesses:
JEAN BUNDAIS,
W. A. CHARTIER.